United States Patent
Minamikawa

(10) Patent No.: US 6,521,557 B1
(45) Date of Patent: Feb. 18, 2003

(54) TRANSPARENT GLASS AND A METHOD FOR MANUFACTURING THE SAME

(75) Inventor: Hiroyuki Minamikawa, Sagamihara (JP)

(73) Assignee: Kabushiki Kaisha Ohara, Kanagawa-ken (JP)

(*) Notice: Subject to any disclaimer, the term of this patent is extended or adjusted under 35 U.S.C. 154(b) by 0 days.

(21) Appl. No.: 09/671,845

(22) Filed: Sep. 27, 2000

(30) Foreign Application Priority Data

Oct. 8, 1999 (JP) .............................. 11-288858
Mar. 28, 2000 (JP) ......................... 2000-087784

(51) Int. Cl.$^7$ .............................. C03C 6/00; C03C 6/02
(52) U.S. Cl. .............................. 501/27; 501/55; 501/67
(58) Field of Search ............................... 501/27, 55, 67

(56) References Cited

U.S. PATENT DOCUMENTS

| 4,607,015 A | * | 8/1986 | Clough et al. |
| 5,200,369 A | * | 4/1993 | Clifford et al. |
| 5,244,848 A | * | 9/1993 | Clifford et al. |
| 6,335,300 B1 | * | 1/2002 | Bordeaux et al. |

FOREIGN PATENT DOCUMENTS

| DE | 3345943 | 6/1984 |
| EP | 0787693 | 8/1997 |
| GB | 459065 | 1/1937 |
| JP | 60 122748 | 7/1985 |
| JP | 61 053130 | 3/1986 |
| JP | 61 281041 | 12/1986 |

* cited by examiner

Primary Examiner—Michael Colaianni
(74) Attorney, Agent, or Firm—Hedman & Costigan, P.C.

(57) ABSTRACT

An aluminosilicate transparent glass has corrosion resistance in the form of mass loss of 4.0 mg or below per 1cm$^2$ of the surface of a specimen upon holding the specimen for five hours in sodium hydroxide solution having concentration of 300 mg(L under test pressure of 50 MPa at 250° C. The glass has a coefficient of thermal expansion within a range from 35×10$^{-7}$/° C. to 50×10$^{-7}$/° C. within a temperature range from 100° C to 300° C. The glass has also powdered glass mass loss rate of 0.1% or below in terms of water resistance, acid resistance and alkali resistance.

8 Claims, No Drawings

TRANSPARENT GLASS AND A METHOD FOR MANUFACTURING THE SAME

BACKGROUND OF THE INVENTION

This invention relates to a transparent glass and, more particularly, to an aluminosilicate transparent glass having excellent corrosion resistance and chemical stability and being suitable for use as glasses for an inspection hole and glass for the level clairvoyance of a boiler.

Borosilicate glass or aluminosilicate glass is currently used for a level watching glass of a boiler or other apparatus. Borosilicate glass is generally used for uses in an environment under a low pressure and aluminosilicate glass is generally used for uses in an environment under a high pressure. Main requisites for glass for the level clairvoyance used in an environment under a high pressure are transparency in the visible light region, low thermal expansion property ($\alpha$: $50 \times 10^{-7}/°$ C. or below), high thermal shock, corrosion and water resistances and, particularly, high alkali resistance. Such glass must particularly have strictly high corrosion resistance under a caustic pressurized condition because sodium hydroxide or like alkali is mixed in an aqueous solution in a boiler whereby pH of the aqueous solution is in the order of 9.3 to 11.0.

The aluminosilicate glass used currently for uses in an environment under a high pressure have adequate low thermal expansion property and thermal shock resistance but its corrosion resistance under a caustic pressurized condition is not sufficient and, for this reason, this glass cannot be used directly as glass for the level clairvoyance. For coping with the problem of corrosion by alkali, mica or an alkali resistant glass is deposited on this glass for use as the glass for the level cliarvoyance (e.g., Japanese Patent Application Laid-open Publication No. 3-252331). The alkali resistant glass, however, contains $Y_2O_3$ which is a costly material and therefore raises the manufacturing cost of the glass. On the other hand, in the borosilicate glass which is used in an environment under a low pressure, the alkali resistant glass is not deposited on the glass for the reason that likelihood of corrosion is small in the environment in which the glass is used. In actuality, however, corrosion progresses significantly in an environment under pressure even if the pressure is of a relatively low level and such borosilicate glass is actually used with the pressure being reduced below a normal specification.

For these reasons, there is a demand for a transparent glass which has high chemical durability (i.e., water, acid and alkali resistances) and corrosion resistance and excellent low expansion and thermal shock resistance properties which can be used directly as the glass for the level clairvoyance without necessity for taking any extra step for coping with the problem of corrosion by alkali such as deposition of an alkali resistant glass.

It is, therefore, an object of the invention to provide a transparent aluminosilicate glass which is adapted for use in both an environment under a high pressure and an environment under a low pressure and, while maintaining the properties of the prior art aluminosilicate glass, namely high light transmittance in a visible light region, low thermal expansion property and high thermal shock resistance, additionally has such high chemical stability (i.e., water, acid and alkali resistances) and corrosion resistance that it is not necessary to deposit mica or alkali resistant glass on the glass and which can be melted at a relatively low temperature.

SUMMARY OF THE INVENTION

Accumulated studies and experiments made by the inventor of the present invention for achieving the above described object of the invention have resulted in the finding, which has led to the present invention, that a glass having high transmittance in the visible light region, low thermal expansion and thermal shock resistance properties and high chemical durability and corrosion resistance can be obtained in a $SiO_2$—$Al_2O_3$—$B_2O_3$—CaO—MgO—BaO—SrO—ZnO—$TiO_2$—$ZrO_2$ glass.

According to the invention, there is provided a transparent glass comprising in mass percent on oxide basis:

| | |
|---|---|
| $SiO_2$ | 45–60% |
| $Al_2O_3$ | 12–25% |
| $B_2O_3$ | 1–5% |
| CaO | 0–10% |
| MgO | 5–16% |
| BaO | 0–5% |
| SrO | 0–5% |
| ZnO | 5–15% |
| $TiO_2$ | 0–5% |
| $ZrO_2$ | 0–5% |
| $Sb_2O_3 + As_2O_3$ | 0–1%. |

In one aspect of the invention, the transparent glass has corrosion resistance in the form of mass loss of 4.0 mg or below per 1 $cm^2$ of the surface of a specimen upon holding the specimen for five hours in sodium hydroxide solution having concentration of 300 mg/L under test pressure of 50 MPa at 250° C.

In another aspect of the invention, the transparent glass has a coefficient of thermal expansion within a range from $35 \times 10^{-7}/°$ C. to $50 \times 10^{-7}/°$ C. within a temperature range from 100° C. to 300° C.

In another aspect of the invention, the transparent glass has powdered glass mass loss rate of 0.1% or below in terms of each of water resistance, acid resistance and alkali resistance.

In another aspect of the invention, the transparent glass has softening point within a range from 850° C. to 950° C.

According to the invention, there is provided a method for manufacturing the above described transparent glass wherein glass materials are melted at a temperature within a range from 1400° C. to 1480° C. and formed to glass.

There is also provided a method for manufacturing a transparent glass wherein the above described transparent glass is heated to a temperature below the softening point of the glass and thereafter is cooled and physically strengthened.

DETAILED DESCRIPTION OF THE INVENTION

Description will now be made about composition of the glass, its corrosion resistance, coefficient of thermal expansion, chemical durability and melting temperature. The composition is expressed in mass percent on oxide basis.

As to the composition of the glass, the amount of the $SiO_2$ ingredient should preferably be 45% or over and 47% or below for facilitating glassifying, and, more preferably, 60% or below for enabling setting of the melting temperature at a relatively low temperature.

The $Al_2O_3$ ingredient is effective for decreasing viscosity without increasing the coefficient of thermal expansion and also for improving corrosion resistance. For achieving these effects, the amount of this ingredient should preferably be 12% or over and, more preferably, 16% or over. For maintaining well melting property and resistance to devitrification, the amount of this ingredient should preferably be 25% or below and, more preferably, 20% or below.

The $B_2O_3$ ingredient is an ingredient which decreases viscosity during melting of the glass while maintaining low thermal expansion property. For achieving these effects, the amount of this ingredient should preferably be 1% or over. For maintaining chemical durability, the amount of this ingredient should preferably be 5% or below.

The CaO ingredient is effective for improving the melting property. For restricting the coefficient of thermal expansion to a low value, the amount of the CaO ingredient should preferably be 10% or below and, more preferably, 8% or below for improving corrosion resistance.

The MgO ingredient is an ingredient which restricts the coefficient of thermal expansion to a low value and decreasing viscosity. For achieving these effects, the amount of this ingredient should preferably be 5% or over and, more preferably, 7% or over. For maintaining excellent resistance to devitrification, the amount of this ingredient should preferably be 16% or below.

The BaO ingredient is effective for improving the melting property. For restricting the coefficient of thermal expansion to a low value, the amount of this ingredient should preferably be 5% or below and, more preferably, 3% or below for improving corrosion resistance.

The SrO ingredient is effective for improving the melting property. For restricting the coefficient of thermal expansion to a low value, the amount of this ingredient should preferably be 5% or below and, more preferably 3% or below for improving corrosion resistance.

The ZnO ingredient is an ingredient which restricts the coefficient of thermal expansion to a low value, decreases viscosity and improves alkali resistance. For achieving these effects, the amount of this ingredient should preferably be 5% or over and, more preferably, 7% or over. For maintaining excellent resistance to devitrification, the amount of this ingredient should preferably be 15% or below and, more preferably, 13% or below.

The $TiO_2$ ingredient is effective for decreasing the coefficient of thermal expansion while maintaining chemical durability of the glass. Addition of 5% or below of this ingredient will suffice for these purposes. If the amount of this ingredient exceeds 5%, the glass tends to be tinted and resistance to devitrification will be deteriorated.

The $ZrO_2$ ingredient is effective for decreasing the coefficient of thermal expansion and improving corrosion resistance. Addition of this ingredient up to 5% will suffice and, if the amount of this ingredient exceeds 5%, the melting property of the glass will be deteriorated.

The $As_2O_3$ and/or $Sb_2O_3$ ingredient may be added as a refining agent. If the total amount of these ingredients exceeds 1%, chemical durability will be deteriorated.

The transparent glass of the present invention does not substantially contain $Y_2O_3$. By not adding $Y_2O_3$ as a material of the glass, the cost of materials of the glass can be significantly reduced.

Since one of uses of the transparent glass of the present invention is the glass for the level clairvoyance for a level indicator of a boiler containing an alkali aqueous solution under a high pressure, the transparent glass should preferably have corrosion resistance in the form of mass loss of 4.0 mg or below, more preferably 3.0 mg or below and, most preferably, 2.0 mg or below per 1 $cm^2$ of the surface of a specimen upon holding the specimen for five hours in sodium hydroxide solution having concentration of 300 mg/L under test pressure of 50 MPa at 250° C.

The transparent glass should preferably have a coefficient of thermal expansion within a range from $35 \times 10^{-7}$/° C. to $50 \times 10^{-7}$/° C. within a temperature range from 100° C. to 300° C. The coefficient of thermal expansion of less than $35 \times 10^{-7}$/° C. will be disadvantageous from the standpoint of productivity. If the coefficient of thermal expansion exceeds $50 \times 10^{-7}$/° C., sufficient thermal shock resistance cannot be achieved and, therefore, a problem of damage of the glass will arise when the glass is abruptly heated or cooled.

Description will now be made about chemical durability of the transparent glass of the present invention.

For preventing corrosion to a maximum extent possible and maintaining transparency of the glass over a long period of time during which the glass is used in contact with water, the transparent glass of the invention should preferably have powdered glass mass loss rate of 0.10% or below, more preferably 0.04% or below and, most preferably 0.02% or below, in terms of water resistance. The powdered glass mass loss rate in terms of water resistance herein means powdered glass mass loss rate measured upon immersing a glass specimen in boiled pure water of pH 6.5 to 7.5 for 60 minutes in accordance with the Method for Measuring Chemical Durability of Optical Glass (Japan Optical Glass Industry Standard JOGIS06-1999).

For preventing corrosion to a maximum extent possible and maintaining transparency of the glass over a long period of time during which the glass is used in contact with acid aqueous solution, the transparent glass of the invention should preferably have powdered glass mass loss rate of 0.10% or below, more preferably 0.08% or below and, most preferably 0.04% or below, in terms of acid resistance. The powdered glass mass loss rate in terms of acid resistance herein means powdered glass mass loss rate measured upon immersing a glass specimen in boiled 0.01N nitric acid for 60 minutes in accordance with the Method for Measuring Chemical Durability of Optical Glass (Japan Optical Glass Industry Standard JOGIS06-1999).

For preventing corrosion to a maximum extent possible and maintaining transparency of the glass over a long period of time during which the glass is used in contact with alkaline aqueous solution, the transparent glass of the invention should preferably have powdered glass mass loss rate of 0.10% or below, more preferably 0.08% or below and, most preferably 0.06% or below, in terms of alkali resistance. The powdered glass mass loss rate in terms of alkali resistance herein means powdered glass mass loss rate measured upon immersing a glass specimen in boiled 0.1N sodium hydroxide aqueous solution for 60 minutes.

In sum, the transparent glass should have powdered glass mass loss rate of 0.10% or below, more preferably 0.08% or below and, most preferably 0.06%, in terms of each of water resistance, acid resistance and alkali resistance.

From the standpoint of processability, the transparent glass of the invention should preferably have softening point within a range from 850° C. to 950° C. and, more preferably within a range from 880° C. to 900° C.

Since there is a case where the transparent glass of the invention is used in a chemical solvent, the glass should preferably have sufficient durability against acetone and toluene.

By properly selecting a composition of raw materials, the transparent glass of the invention can be manufactured by melting the glass raw materials at a temperature within a range from 1400° C. to 1480° C. and forming the glass. Since the raw materials can be melted at a relatively low temperature of 1480° C. or below, the glass can be manufactured at a low cost without damaging the furnace.

The transparent glass of the invention should preferably be physically strengthened. For physically strengthening the transparent glass of the invention, the air-cooling method, for example, can be employed. More specifically, the glass is heated to a temperature which is lower by several ° C. to several tens ° C. than the softening point, depending upon the composition of the glass and then the glass is taken out of the furnace and air-cooled to produce permanent compressive stress in the surface portion of the glass at room temperature. The transparent glass thereby is further strengthened in its mechanical strength, thermal shock resistance and corrosion resistance.

EXAMPLES

Examples of the invention will now be described. Raw materials were weighed and mixed so as to form compositions of Examples No. 1 to No.13 described in Tables 1 and 2 and melted in a platinum crucible at a temperature within a range from 1400° C. to 1480° C. for three to four hours. During melting, the glass materials were stirred with a stirrer made of platinum for one to two hours for homogenization. Then the glass was taken out of the crucible to provide the transparent glass of the invention. The coefficient of thermal expansion (100° C. to 300° C.), thermal shock resistance, powdered glass mass loss rate in terms of water, acid and alkali resistances, amount of corrosion in terms of corrosion resistance, softening point, refractive index, dispersion and light transmittance of the glass specimens obtained (Examples No.1 to No. 13) are shown in Tables 4 and 5.

The thermal shock resistance test was conducted with respect to glass specimens having outer diameter of 20 mm and thickness of 12 mm in accordance with the method described in JISB8286 "Inspection Hole for Pressure Vessel" and glass specimens in which no crack or other defect was observed are marked "OK". The amount of corrosion in terms of corrosion resistance was measured in accordance with the method described in JISB8211 "Water Level Indicator Glass" to calculate mass loss per 1 $cm^2$ of the surface of the specimen. In this corrosion amount in terms of corrosion resistance only, results of measurement made after physical strengthening by air-cooling are described. As regards water and acid resistances, the transparent glass was pulverized and powdered glass mass loss rate (%) was measured in accordance with the Method for Measuring Chemical Durability of Optical Glass (Japan Optical Glass Industry Standard JOGIS06-1999). As regards alkali resistance, the transparent glass which was prepared in the same manner as in the water and acid resistance tests was immersed in boiled 0.1N sodium hydroxide (pH 12 to 13) for 60 minutes to calculate powdered glass mass loss rate (%).

Compositions and melting temperatures of two prior art glasses are shown as Comparative Examples No. 1 and No. 2 in Table 3 and the coefficient of thermal expansion (100° C. to 300° C.), thermal shock resistance, powdered glass mass loss rate in terms of water, acid and alkali resistances, amount of corrosion in terms of corrosion resistance and light transmittance of the glass specimens of Comparative Examples No. 1 and No. 2 are shown in Table 6.

TABLE 1

| | Examples (mass %) | | | | | |
|---|---|---|---|---|---|---|
| | 1 | 2 | 3 | 4 | 5 | 6 |
| $SiO_2$ | 48.3 | 47.5 | 49.5 | 53.1 | 51.9 | 56.0 |
| $Al_2O_3$ | 17.0 | 16.0 | 19.2 | 16.4 | 17.1 | 12.0 |
| $B_2O_3$ | 3.6 | 4.0 | 3.6 | 3.5 | 3.5 | 4.2 |
| CaO | 9.8 | 8.5 | 6.5 | 8.8 | 7.5 | 5.3 |
| MgO | 10.0 | 7.5 | 6.8 | 8.0 | 7.7 | 11.0 |
| BaO | | | | | | |
| SrO | | | | | | |
| ZnO | 5.2 | 9.3 | 12.0 | 7.9 | 10.0 | 6.0 |
| $TiO_2$ | 3.3 | 4.0 | 1.0 | | | 1.8 |
| $ZrO_2$ | 2.5 | 3.0 | 1.4 | 2.0 | 2.3 | 3.7 |
| $Sb_2O_3$ + $As_2O_3$ | 0.3 | 0.2 | | 0.3 | | |
| Melting temperature (° C.) | 1470 | 1450 | 1470 | 1470 | 1450 | 1480 |

TABLE 2

| | Examples (mass %) | | | | | | |
|---|---|---|---|---|---|---|---|
| | 7 | 8 | 9 | 10 | 11 | 12 | 13 |
| $SiO_2$ | 52.2 | 52.2 | 47.0 | 52.2 | 45.2 | 54.0 | 52.2 |
| $Al_2O_3$ | 19.6 | 19.6 | 21.6 | 19.6 | 22.0 | 16.0 | 17.2 |
| $B_2O_3$ | 3.6 | 3.6 | 3.6 | 3.6 | 5.0 | 5.0 | 2.6 |
| CaO | 7.5 | 2.5 | 7.5 | | 7.5 | | 6.0 |
| MgO | 7.8 | 12.8 | 7.8 | 15.3 | 7.8 | 13.7 | 7.8 |
| BaO | | | | | | 4.0 | |
| Sro | | | | | | | 1.5 |
| ZnO | 10.0 | 10.0 | 12.5 | 10.0 | 12.5 | 7.0 | 10.0 |
| $TiO_2$ | | | | | | | |
| $ZrO_2$ | | | | | | | 2.4 |
| $Sb_2O_3$ + $As_2O_3$ | 0.3 | 0.2 | 0.3 | 0.3 | | 0.3 | 0.3 |
| Melting temperature (° C.) | 1450 | 1450 | 1450 | 1450 | 1440 | 1480 | 1480 |

TABLE 3

| | Comparative Examples (mass %) | |
|---|---|---|
| | 1 | 2 |
| $SiO_2$ | 55.0 | 59.55 |
| $Al_2O_3$ | 15.0 | 17.62 |
| $B_2O_3$ | 5.0 | 4.32 |
| CaO | | 0.253 |
| MgO | 11.7 | 13.16 |
| ZnO | 8.0 | 2.13 |
| $TiO_2$ | | 0.016 |
| $ZrO_2$ | | |
| BaO | 4.0 | 1.0 |
| $Na_2O$ | 0.5 | 1.13 |
| $K_2O$ | 0.5 | 0.834 |
| $Fe_2O_3$ | | 0.11 |
| $Sb_2O_3 + As_2O_3$ | 0.3 | |
| Melting temperature (°C.) | 1500 | 1550 |

TABLE 4

| | Examples | | | | | |
|---|---|---|---|---|---|---|
| | 1 | 2 | 3 | 4 | 5 | 6 |
| Coefficient of thermal expansion ($\times 10^{-7}$/°C.) (100–300°C.) | 50 | 47 | 46 | 45 | 44 | 44 |
| Thermal shock test | OK | OK | OK | OK | OK | OK |
| Mass loss rate (%), water | 0.01 | 0.02 | 0.01 | 0.01 | 0.00 | 0.01 |
| Mass loss rate (%), acid | 0.09 | 0.03 | 0.06 | 0.07 | 0.04 | 0.04 |
| Mass loss rate (%), alkali | 0.05 | 0.04 | 0.04 | 0.06 | 0.05 | 0.09 |
| Amount of corrosion (mg/cm$^2$) | 0.98 | | | | 0.26 | |
| After strengthening | 0.41 | | | | 0.17 | |
| Softening point (°C.) | | | | | 882 | |
| Refractive Index nd | | | | | 1.5673 | |
| Dispersion vd | | | | | 58.4 | |
| Transmittance (400–500 nm) | 75% or over | 75% or over | 80% or over | 85% or over | 85% or over | 80% or over |
| Color (eye observation) | pale yellow | pale yellow | pale yellow | no color | no color | pale yellow |

TABLE 5

| | Examples (mass %) | | | | | | |
|---|---|---|---|---|---|---|---|
| | 7 | 8 | 9 | 10 | 11 | 12 | 13 |
| Coefficient of thermal expansion ($\times 10^{-7}$/°C.) (100–300°C.) | 43 | 40 | 46 | 41 | 46 | 42 | 43 |
| Thermal shock test | OK | OK | OK | OK | OK | OK | OK |
| Mass loss rate (%), water | 0.01 | 0.02 | 0.04 | 0.0 | 0.03 | 0.01 | 0.02 |
| Mass loss rate (%), acid | 0.06 | 0.04 | 0.10 | 0.04 | 0.10 | 0.05 | 0.03 |
| Mass loss rate (%), alkali | 0.04 | 0.07 | 0.05 | 0.10 | 0.08 | 0.10 | 0.05 |
| Amount of corrosion (mg/cm$^2$) | | 3.00 | | | | | |
| After strengthening | | 2.41 | | | | | |
| Softening point (°C.) | | | | | | | 889 |
| Refractive Index nd | | | | | | | 1.5687 |
| Dispersion vd | | | | | | | 57.5 |
| Transmittance (400–500 nm) | 85% or over | 85% or over | 85% or over | 85% or over | 85% or over | 85% or over | 85% or over |
| Color (eye observation) | no color | no color | no color | no color | no color | no color | no color |

TABLE 6

|  | Comparative Examples | |
|---|---|---|
|  | 1 | 2 |
| Coefficient of thermal expansion ($\times 10^{-7}/°$ C.) (100–300° C.) | 37 | 38 |
| Thermal shock test | OK | OK |
| Mass loss rate (%), water | 0.01 | 0.01 |
| Mass loss rate (%), acid | 0.04 | 0.02 |
| Mass loss rate (%), alkali | 0.09 | 0.10 |
| Amount of corrosion (mg/cm$^2$) | 4.27 | 5.69 |
| Transmittance (400–500 nm) | 85% or over | 85% or over |
| Color (eye observation) | no color | no color |

As will be apparent from Tables 4 and 5, the transparent glass of the present invention exhibits the coefficient of thermal expansion of $50\times10^{-7}/°$ C. and the powdered glass mass loss rate of 0.10% or below in terms of chemical durability in all aspects as well as the amount of corrosion of 3.0 mg or below. In the amount of corrosion after physical strengthening of the glass, improvement in the order of about 20% to 50% is observed in comparison with the glass which has not been physically strengthened. Transmittance of the glass in the visible light region is 75% or over, which indicates that the glass is very suitable for the glass of a level indicator. The transparent glass of the invention can be manufactured by melting raw materials at a low temperature of 1480° C. or below and this indicates that the glass is excellent in respect of productivity.

As described above, the transparent glass of the invention is a transparent aluminosilicate glass having the above described features and is suitable for use as glass for an inspection hole of a pressure vessel or glass for the level clairvoyance of a boiler.

The transparent glass of the invention can also be applied for glass of a reflection type level indicator which enables the level of liquid to be observed by the prism effect by forming a groove on the plane of the glass which comes in direct contact with the liquid.

What is claimed is:

1. A transparent glass consisting in mass percent on oxide basis of:

| SiO$_2$ | 45–60% |
|---|---|
| Al$_2$O$_3$ | 12–25% |
| B$_2$O$_3$ | 1–5% |
| CaO | 0–10% |
| MgO | 5–16% |
| BaO | 0–5% |
| SrO | 0–5% |
| ZnO | 9–15% |
| TiO$_2$ | 0–5% |
| ZrO$_2$ | 0–5% |
| Sb$_2$O$_3$ + As$_2$O$_3$ | 0–1%. |

2. A transparent glass as defined in claim 1 having corrosion resistance in the form of mass loss of 4.0 mg or below per 1 cm$^2$ of the surface of a specimen upon holding the specimen for five hours in sodium hydroxide solution having concentration of 300 mg/L under test pressure of 50 MPa at 250° C.

3. A transparent glass as defined in claim 1 having a coefficient of thermal expansion within a range from $35\times 10^{-7}/°$ C. to $50\times 10^{-7}/°$ C. within a temperature range from 100° C. to 300° C.

4. A transparent glass as defined in claim 1 having powdered glass mass loss rate of 0.1% or below in terms of water resistance, acid resistance and alkali resistance.

5. A transparent glass as defined in claim 1 having softening point within a range from 850° C. to 950° C.

6. A transparent glass as defined in claim 1 being manufactured by melting raw materials of the glass at a temperature within a range from 1400° C. to 1480° C.

7. A transparent glass as defined in claim 1 consisting in mass percent on oxide basis of:

| SiO$_2$ | 45–60% |
|---|---|
| Al$_2$O$_3$ | 12–25% |
| B$_2$O$_3$ | 1–5% |
| CaO | 0–10% |
| MgO | 7–16% |
| BaO | 0–5% |
| SrO | 0–5% |
| ZnO | 9–15% |
| TiO$_2$ | 0–5% |
| ZrO$_2$ | 0–5% |
| Sb$_2$O$_3$ + As$_2$O$_3$ | 0–1%. |

8. A transparent glass as defined in claim 7 being manufactured by melting raw materials of the glass at a temperature within a range from 1400° C. to 1480° C.

\* \* \* \* \*